(12) United States Patent
Tolan et al.

(10) Patent No.: US 7,637,471 B2
(45) Date of Patent: Dec. 29, 2009

(54) COMPONENT LOADING TOOL FOR ASSEMBLY OPERATIONS

(75) Inventors: Daniel G. Tolan, Ortonville, MI (US);
Krishna P. Suryanarayan, Warren, MI (US); Anthony W. Jablonski, Grand Blanc, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 371 days.

(21) Appl. No.: 11/620,060

(22) Filed: Jan. 5, 2007

(65) Prior Publication Data
US 2008/0164389 A1 Jul. 10, 2008

(51) Int. Cl.
*F16M 13/00* (2006.01)
(52) U.S. Cl. .................................................. 248/544
(58) Field of Classification Search ............. 248/544, 248/127, 424, 429, 176.1, 279.1, 346.06; 92/169.3, 169.2, 161
See application file for complete search history.

(56) References Cited

U.S. PATENT DOCUMENTS

| 4,527,783 A | 7/1985 | Collora et al. | |
|---|---|---|---|
| 4,779,515 A * | 10/1988 | Staub, Jr. | 92/128 |
| 5,012,998 A * | 5/1991 | Gautier et al. | 248/222.14 |
| 7,472,458 B2 * | 1/2009 | Oddsen, Jr. | 16/255 |
| 2007/0137398 A1 * | 6/2007 | Tokumo et al. | 74/512 |

FOREIGN PATENT DOCUMENTS

DE 60121120 T2 1/2007

* cited by examiner

*Primary Examiner*—Ramon O Ramirez

(57) ABSTRACT

A tool is provided for loading a component to a desired position relative to a body. The tool has a base adapted to removably hang on the body and a support that is mounted on the base by first track assemblies so that the support may translate in a first direction relative to the body. A carriage is mounted on the support by second track assemblies so that the carriage may travel in a second direction relative to the body. A turntable is mounted on the carriage by a pivot so that the turntable may rotate on the carriage. A component holding fixture is mounted on the turntable for supporting the component. A guide path mechanism acts between the carriage and the base and defines a path of movement of the carriage toward the body so that the component is carried to a desired location on the body for attachment thereto.

16 Claims, 4 Drawing Sheets

COMPONENT LOADING TOOL FOR ASSEMBLY OPERATIONS

FIELD OF THE INVENTION

The present invention relates to a tool for loading a component to a body for attachment thereto, and more particularly to a component loading tool for loading a component such as a brake booster assembly to its final position in readiness for attachment to a vehicle body bulkhead.

BACKGROUND OF THE INVENTION

In the manufacturing industries, it is well known to assemble motor vehicles and other articles of manufacture by assembling a number of components to a body by a fastener such as bolts, screws, and rivets. In the manufacturing environment, such assembly operations are conducted in a way that is economically efficient in order to reduce cycle time and assembly labor cost and also ergonomically efficient in order to provide good working conditions for the assembly operators.

A typical assembly operation is conducted by an assembly operator who carries a component to the vehicle and holds the component at its desired location while the fasteners are installed. The assembly operation must be designed to account for the weight of the component, the presence of obstacles such as adjacent structures that might obstruct the path of component entry to the body, and the need to support the weight of the component while the fasteners are installed. An example of such an assembly operation is the loading and attachment of a brake booster assembly to a vehicle body bulkhead. The typical brake booster weighs several pounds and must be carefully routed by the assembly operator in order to clear adjoining structures such as the sheet metal shock tower of the vehicle body.

SUMMARY OF THE INVENTION

A tool is provided for loading a component to a desired position relative to a body. The tool has a base adapted to removably hang on the body and a support that is mounted on the base by first track assemblies so that the support may travel in a first direction relative to the body. A carriage is mounted on the support by second track assemblies so that the carriage may travel in a second direction relative to the body. A turntable is mounted on the carriage by a pivot so that the turntable may rotate on the carriage. A component holding fixture is mounted on the turntable for supporting the component. A guide path mechanism acts between the carriage and the base and defines a path of travel of the carriage toward the body so that the component is carried to a desired location on the body for attachment thereto.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
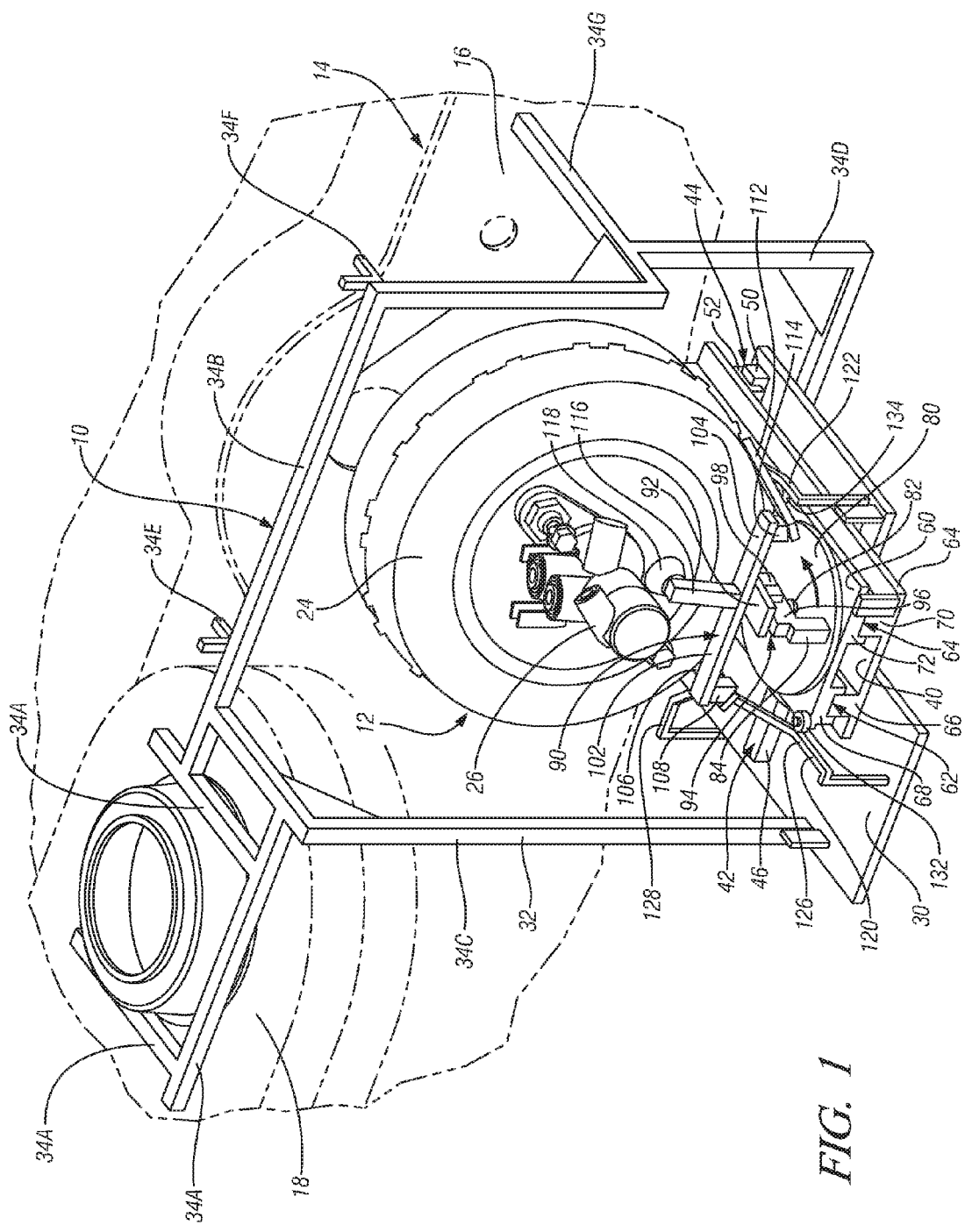
FIG. 1 is a perspective view of a component loading tool that has a brake booster assembly loaded thereon and also shows a vehicle body indicated in phantom line.

Referring to FIG. 1, a component loading tool is generally indicated at 10 for loading a brake booster assembly 12 into position within the engine compartment of a motor vehicle body.

The vehicle body, generally indicated at 14, is shown in phantom line and includes a sheet metal bulkhead 16 that extends cross-body and forms a wall between a passenger compartment that is located rearward of the bulkhead 16 and an engine compartment that is located forward of the bulkhead 16. A sheet metal shock tower 18 adjoins the left hand side of the bulkhead 16, it being understood that the vehicle body also has a right hand shock tower, not shown.

The brake booster assembly 12 includes a relatively bulky vacuum power unit 24 that operates a master cylinder unit 26.

The component loading tool 10 includes a base plate 30 that is hung on the vehicle body by a hanger frame 32. The hanger frame 32 is constructed of a number of welded together tubes that are welded to the base plate 30 and are configured to engage with various features of the vehicle body 10 to hang the base plate 30 on the vehicle body 10. Hanger tubes 34A seat around the top of the shock tower 18 and are connected to the base plate 30 by a horizontal hanger tube 34B and vertical hanger tubes 34C and 34D. Hanger tube brackets 34E and 34F extend from the horizontal hanger tube 34B and rest on a ledge provided by the bulkhead 16. Hanger tube leg 34G engages the face of the bulkhead 16.

Figure 4:
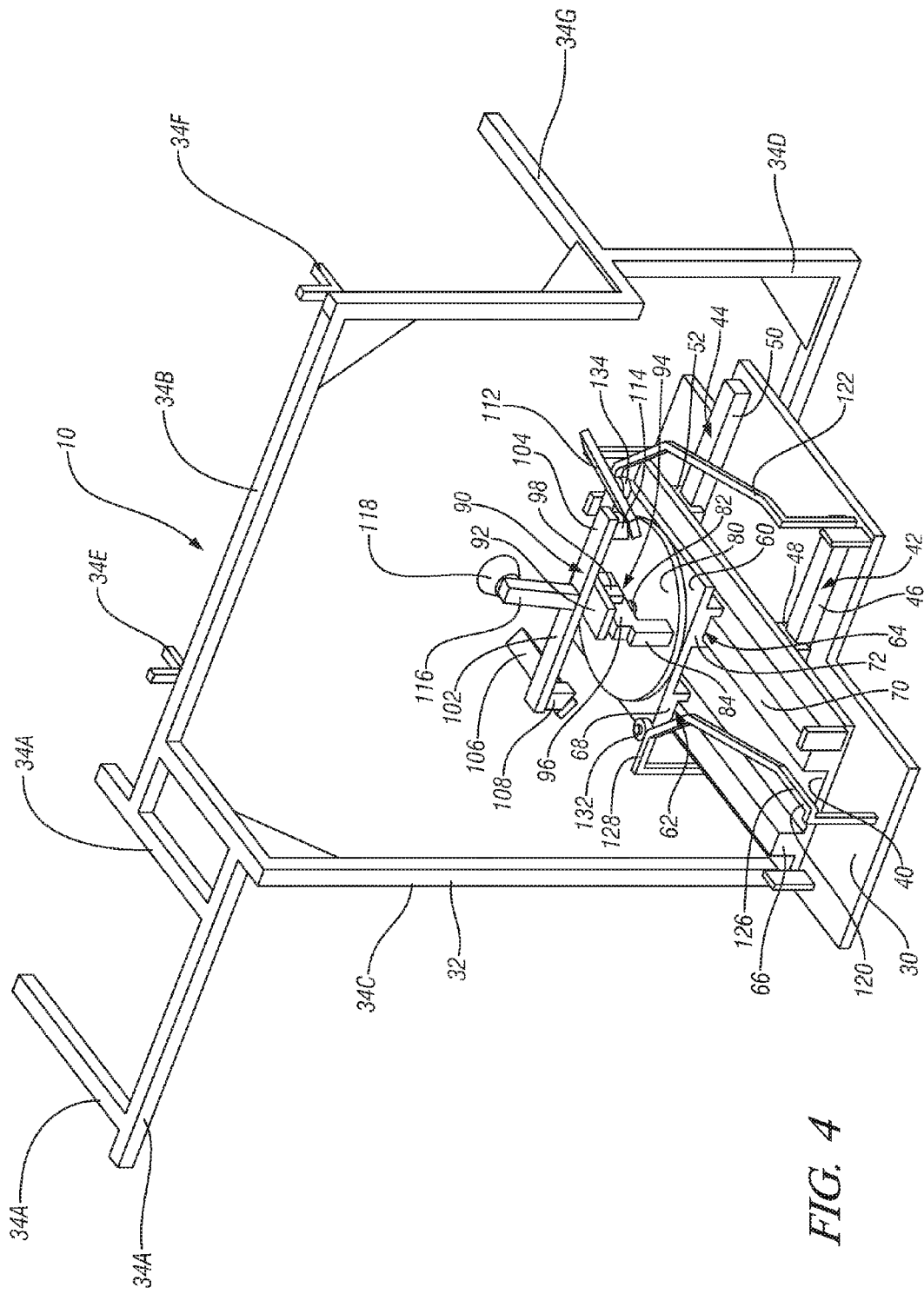
FIG. 4 is another perspective view but showing the component loading tool at its final position in which the brake booster assembly will reach its final position in readiness for installation of fasteners to attach the brake booster assembly to the vehicle body bulkhead.

A support plate 40 is mounted on the base plate 30 by rectilinear track assemblies 42 and 44 that are best seen in FIG. 4 and mount the support plate 40 on the base plate 30 so that the support plate 40 may travel laterally relative to the base plate 30 and the vehicle body 10. As seen in FIG. 4, the track assembly 42 includes a lower track rail 46 that is attached to the base plate 30 and an upper track rail 48 that is attached to underside of the support plate 40. The upper track rail 48 slides on the lower track rail 46. The track assembly 44 includes a lower track rail 50 that is attached to the base plate 30 and an upper track rail 52 that is attached to the underside of the support plate 40. The upper track rail 52 slides on the lower track rail 50. The track assemblies 42 and 44 may be in a horizontal plane or may be inclined from the horizontal so that the support plate 40 will have a vertical component of movement during its lateral travel.

A carriage plate 60 is mounted on the support plate 40 by rectilinear track assemblies 62 and 64 so that the carriage plate 60 may travel in the fore and aft directions, longitudinally of the vehicle 10. The track assembly 62 includes a lower track rail 66 that is attached to the support plate 40 and an upper track rail 68 that is attached to the underside of the carriage plate 60. The upper track rail 68 slides on the lower track rail 66. The track assembly 64 includes a lower track rail 70 that is attached to the support plate 40 and an upper track rail 72 that is attached to the underside of carriage plate 60. The upper track rail 72 slides on the lower track rail 70. The track assemblies 62 and 64 may be in a horizontal plane or may be inclined from the horizontal so that the carriage plate 60 will have a vertical component of movement during its fore and aft travel.

A turntable 80 is mounted on the carriage plate 60 by a pivot pin 82 so that the turntable 80 may rotate on the carriage plate 60 about a vertical axis established by the pivot pin 82. A turntable extension 84 rises from the turntable 80.

A component holding fixture, generally indicated at 90, is mounted on the turntable 80 for holding the brake booster assembly 12. The fixture 90 has a fixture plate 92 that is connected to the turntable extension 84 of the turntable 80 by a track assembly, generally indicated at 94. The track assembly 94 includes a lower track 96 that is mounted on the turntable extension 84 and an upper track 98 that is mounted on the underside of fixture plate 92. The upper track 98 slides on the lower track 96 so that the fixture plate 92 may travel longitudinally on the turntable 80.

The component holding fixture 90 also has a left arm 102 and right arm 104 that extend laterally from the fixture plate 92. A booster support left prong 106 is connected to the left arm 102 by a swivel 108 that lets the left prong 106 rotate about an axis that extends longitudinally of the vehicle. Likewise, a booster support right prong 112 is connected to the right arm 104 by a swivel 114 that lets the left prong 106 rotate about an axis that extends longitudinally of the vehicle 10. A neck 116 rises from the fixture plate 92 and carries a suction cup 118 that will engage with the brake booster assembly 12 to hold the brake booster assembly 12 on the prongs 106 and 112.

Figure 2:
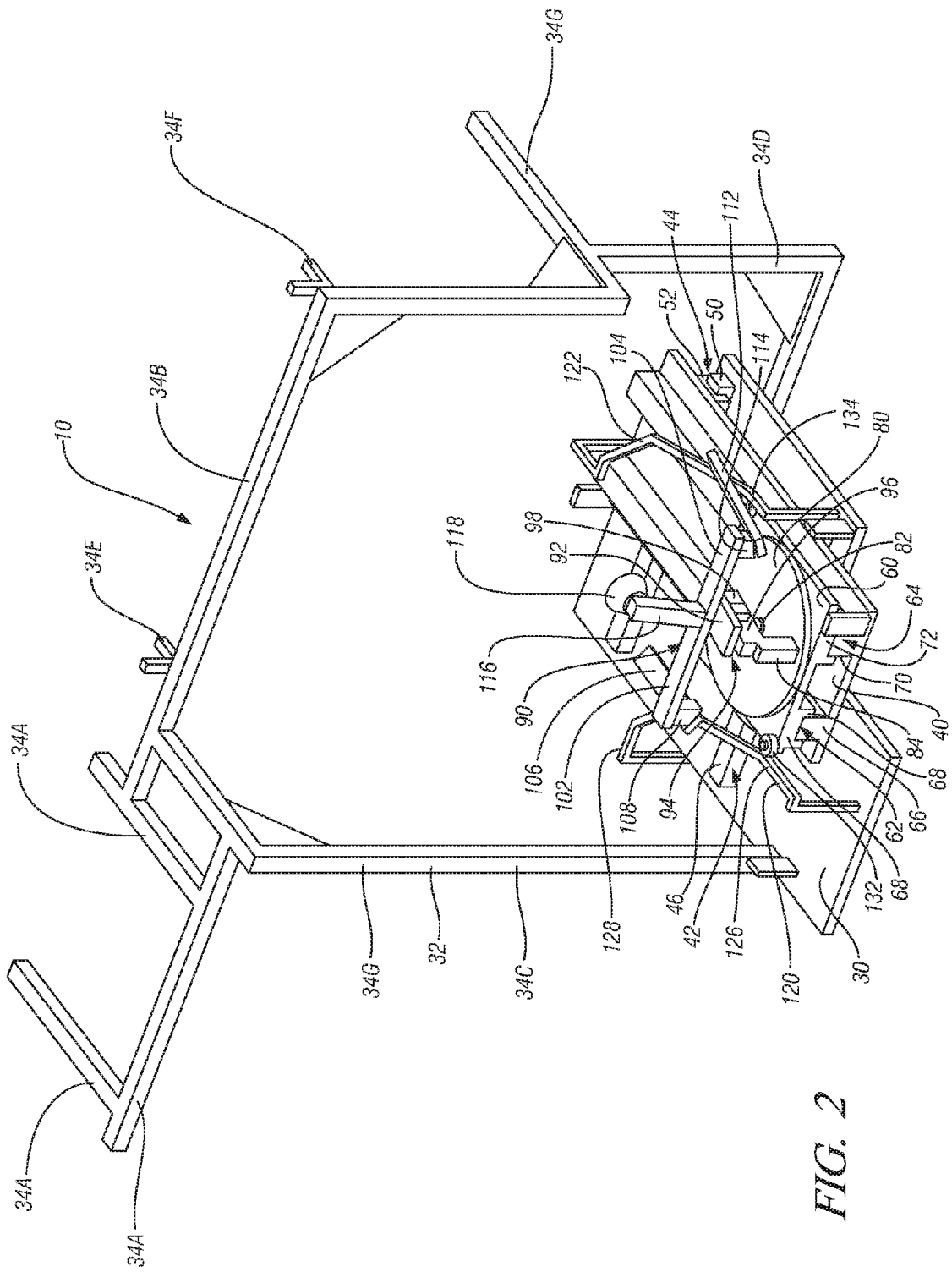
FIG. 2 is a perspective view of the component loading tool shown without the brake booster assembly.

As best seen in FIG. 2, a left cam guide 120 and a right cam guide 122 are mounted on the base plate 30 and define a path of complex movement of the brake booster 12 toward its installed position on the bulkhead 16. The cam guide 120 has a front part 126 that angles somewhat leftwardly toward the shock tower 18 and a rear part 128 that angles more sharply leftwardly toward the shock tower 18. Cam guide 122 is similarly configured. A cam follower in the form of a cam roller 132 is mounted on the left front corner of the carriage plate 60 and rides on the left cam guide 120. A cam follower in the form of a cam roller 134 is mounted on the right rear corner of the carriage plate 60 and rides on the right cam guide 122.

OPERATION

Referring to FIG. 2, the component loading tool is shown in its empty condition. The component loading tool has considerable weight and accordingly would be mounted on an overhead hoist, or a load balancing arm, or perhaps a robot, in order assist a vehicle assembly operator in lifting and moving the component loading tool to its position of FIG. 1 in which the component loading tool 10 is supported on the vehicle body 14 by the hanger frame 32.

The brake booster assembly 12 may be placed onto the fixture 90 of the component loading tool 10 either before or after the tool 10 has been positioned onto the vehicle body 14. The weight of the brake booster assembly 12 is supported by the prongs 106 and 112, and the prongs may swivel about their respective pivots 108 and 114 as needed to cradle the brake booster assembly 12. The suction cup 118 connects with a surface of the brake booster assembly 12 to hold the brake booster assembly 12 in place on the prongs 106 and 112 of the fixture 90.

In FIG. 1, brake booster assembly 12 is located several inches longitudinally forward of its final mounted position of the bulkhead 16 and several inches laterally to the right of its final mounted position on the bulkhead 16. The operator pushes in the rearward direction on either the holding fixture 90 or on the brake booster assembly 12 in order to move the brake booster assembly 12 toward its installed position. As the holding fixture 90 is pushed rearwardly toward the bulkhead 16, the turntable 80 and the carriage plate 60 connected therewith also travel rearwardly as permitted by the track assemblies 62 and 64 that mount the carriage plate 60 on the support plate 40. During the rearward longitudinal movement of the carriage plate 60, the cam rollers 132 and 134 act as cam followers and ride along the cam guides 120 and 122 and cause the carriage plate 60 and the support plate 40 to travel laterally in the leftward direction toward the shock tower 18.

Figure 3:
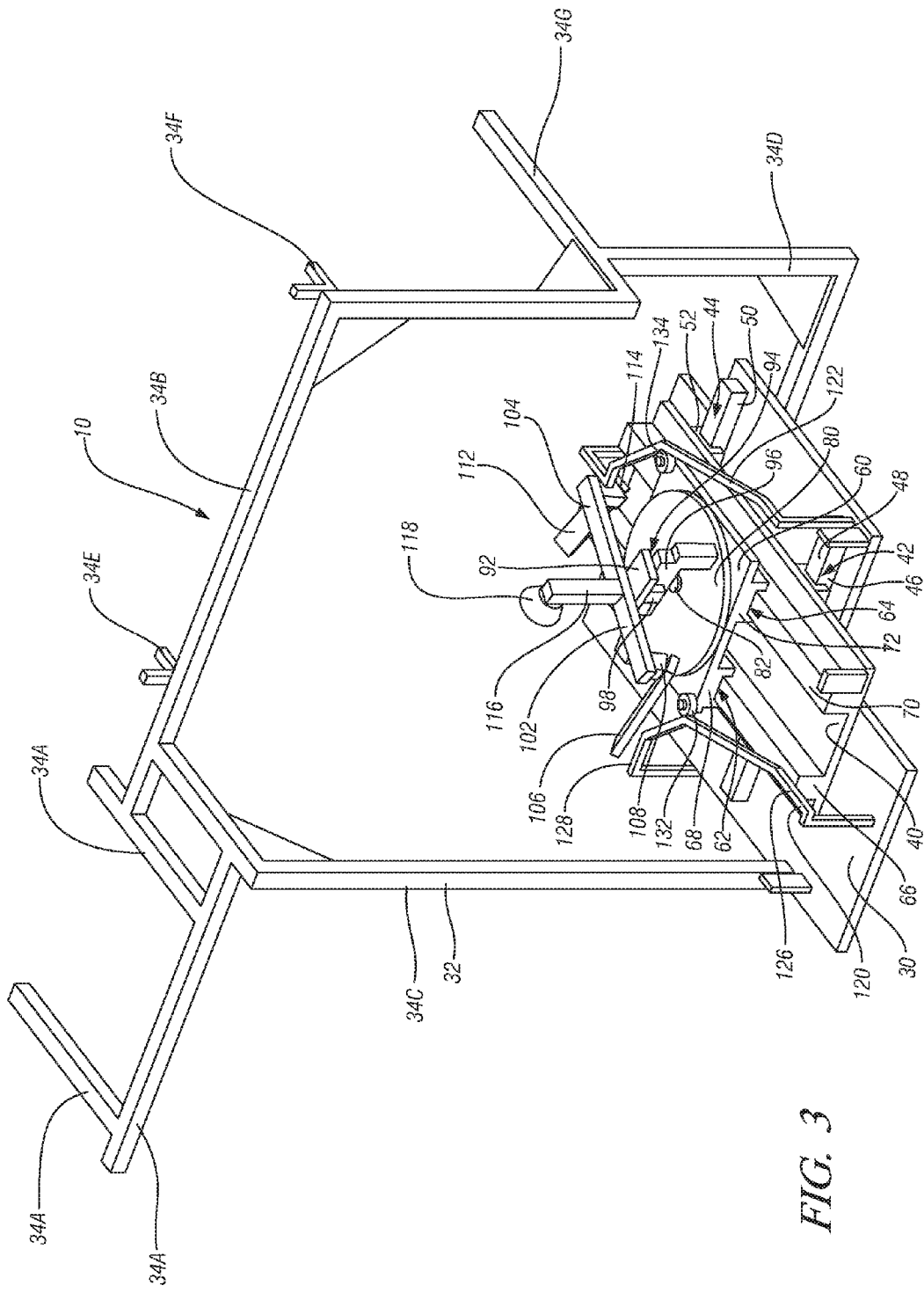
FIG. 3 is a view similar to FIG. 2 but showing certain parts of the component loading tool pushed rearward and rotated to indicate the path of travel of the brake booster assembly.

Referring to FIG. 3, it is seen that during the rearward movement of the brake booster assembly 12 toward its installed position, the assembly operator can also swivel the turntable 80 and the fixture 90 about the pivot pin 82 acting between the turntable 80 and the carriage plate 60. In addition, the fixture plate 92 that mounts the fixture 90 on the turntable 80 can be moved back and forth in relation to the turntable 80 as permitted by the track assembly 94.

Thus, it is seen that the component loading tool 10 provides many different freedoms of movement and manipulation by which the brake booster assembly 12 is provided with a complex path of movement that will effectively negotiate the brake booster assembly 12 around the shock tower 18 and any other obstacles and bring it to its final position ready for attachment to the bulkhead 16. The cam guides 120 and 122 cooperate with the cam rollers 132 and 134 to form a guide path mechanism that will automatically guide the movement of the carriage plate 60 to bring the brake booster assembly 12 close to the desired position. In addition, the assembly operator has the additional freedom to rotate the turntable 80 about the pivot pin 82 and also slide the holding fixture 90 relative to the turntable 80 via the track assembly 94 as needed to further guide the brake booster assembly 12 around any obstacles and into its final position ready for the installation of bolts or other fasteners.

After the brake booster assembly 12 has reached its final position, the suction cup 118 is released from the brake booster assembly 12 and the component holding tool 10 is removed from the vehicle body 14.

The foregoing description of the invention is merely exemplary in nature and, thus, variations thereof are intended to be within the scope of the invention. Although the example shown herein is that of loading a brake booster assembly into a vehicle body bulkhead, it will be understood that the component loading tool can be employed in loading any device into a vehicle or other body to which components are commonly mounted.

In addition, it will be understood that the support plate 40 could be mounted on the base plate 30 by longitudinal extending track assemblies, in which case the carriage plate 60 would be mounted on the support plate 40 by lateral extending track assemblies. These track assemblies are preferably, but not necessarily, arranged at approximately 90 degrees to one another, as determined by the desired path of movement. In addition, these track assemblies are not limited to a strictly longitudinal and lateral orientation, and may be skewed somewhat depending upon the desired path of movement.

Furthermore, the track assemblies are not limited to the particular slide tracks shown in the drawing, but may be chosen from the various slides, tracks, rollers, ball screws, or other track devices known in the industry. Although the base plate 30 and the support plate 40 and the carriage plate 60 are shown in the drawings as solid metal plates, the base plate 30 and the support plate 40 and the carriage plate 60 can be constructed of rods or tubes to be of lighter weight.

What is claimed is:

1. A tool for loading a component to a desired position relative to a body, comprising:
    a base adapted to removably hang on the body;
    a support mounted on the base by first track assemblies so that the support may travel in a first direction relative to the body;
    a carriage mounted on the support by second track assemblies so that the carriage may travel in a second direction toward the body;
    a turntable mounted on the carriage by a pivot so that the turntable may rotate on the carriage;
    a component holding fixture mounted on the turntable for supporting the component;
    and a guide path mechanism acting between the carriage and the base and defining a path of travel of the carriage to carry the component to the desired location; said guide path mechanism having cam guides mounted on the base plate on opposing lateral sides of the carriage and cam rollers mounted on each of the sides of the carriage and riding on the cam guides to guide the carriage.

2. The tool of claim 1 further comprising said holding fixture being mounted on the turntable by a third track assembly so that the holding fixture may be moved relative to the turntable.

3. The tool of claim 1 further comprising said holding fixture having a suction cup for holding the component.

4. The tool of claim 3 further comprising the prongs being attached to the holding fixture by swivels.

5. The tool of claim 1 further comprising said holding fixture having a pair of prongs for holding the component.

6. The tool of claim 1 further comprising the component holding fixture having at least one prong and one suction cup for holding the component.

7. The tool of claim 1 further comprising the direction of movement defined by the first track assemblies extending at approximately 90 degrees from the direction of movement defined by the second track assemblies.

8. The tool of claim 1 further comprising said first track assemblies extending laterally of the body and the second track assemblies extending longitudinally of the body.

9. A tool for loading a brake booster assembly to a desired position on a vehicle body bulkhead in readiness for attachment to the bulkhead, comprising:
    a tool base plate having a hanger for removably hanging the tool base plate on the body;
    a support plate mounted on the tool base plate by a first pair of track assemblies so that the support plate may travel in a first direction laterally of the vehicle body;
    a carriage plate mounted on the support plate by a pair of second track assemblies so that the carriage plate may travel in a second direction longitudinally of the vehicle body;
    a turntable mounted on the carriage plate by a pivot so that the turntable may rotate on the carriage plate;
    a brake booster holding fixture mounted on the turntable for supporting the booster;
    and at least one cam follower carried by the carriage plate and engaging with a cam guide mounted on the base plate to define a path of lateral and longitudinal movement of the carriage toward and away from the bulkhead.

10. The tool of claim 9 further comprising a cam roller mounted on each of opposed sides of the carriage and a cam guide mounted on the base plate on each side of the path of movement of the carriage and the cam rollers engage with the cam guide to define the path of lateral and longitudinal movement of the carriage toward and away from the bulkhead.

11. The tool of claim 9 further comprising a third track assembly mounting the holding fixture on the turntable.

12. The tool of claim 9 further comprising said brake booster holding fixture having a suction cup and a pair of prongs for holding the brake booster.

13. The tool of claim 12 further comprising the prongs being attached to the holding fixture by swivels.

14. The tool of claim 9 further comprising the component holding fixture having at least one prong and one suction cup for holding the component.

15. The tool of claim 9 in further comprising the direction of movement defined by the first track assemblies extending at approximately 90 degrees from the direction of movement defined by the second track assemblies.

16. The tool of claim 9 further comprising said brake booster holding fixture having a pair of prongs and a suction cup for holding the brake booster and being mounted on the turntable by a third track assembly so that the brake booster holding fixture can travel relative to the turntable.

* * * * *